US012718668B2

(12) United States Patent
DiGangi et al.

(10) Patent No.: US 12,718,668 B2
(45) Date of Patent: Aug. 25, 2026

(54) ATM SURROUNDING LIGHTING SELF-DIAGNOSIS

(71) Applicant: Wells Fargo Bank, N.A., San Francisco, CA (US)

(72) Inventors: Frank A. DiGangi, Statesville, NC (US); James Merritt Fordham, III, Fort Lauderdale, FL (US); Angel L. Johnson, Las Cruces, NM (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/806,069

(22) Filed: Aug. 15, 2024

(65) Prior Publication Data

US 2026/0051228 A1 Feb. 19, 2026

(51) Int. Cl.
*G07F 19/00* (2006.01)

(52) U.S. Cl.
CPC .......... *G07F 19/209* (2013.01); *G07F 19/206* (2013.01)

(58) Field of Classification Search
None
See application file for complete search history.

(56) References Cited

U.S. PATENT DOCUMENTS

| | | | | |
|---|---|---|---|---|
| 5,945,602 | A | 8/1999 | Ross | |
| 6,057,646 | A * | 5/2000 | Pieroth | G07F 19/20 315/149 |
| 10,137,903 | B2 | 11/2018 | Tascione et al. | |
| 10,217,329 | B1 * | 2/2019 | Phillips | G07F 19/202 |
| 10,755,494 | B2 | 8/2020 | Venkiteswaran et al. | |
| 10,796,537 | B1 * | 10/2020 | Farivar | G07F 19/209 |
| 10,943,441 | B1 * | 3/2021 | Watson, III | G07D 11/235 |
| 11,069,050 | B1 | 7/2021 | Harvey et al. | |

(Continued)

FOREIGN PATENT DOCUMENTS

| | | |
|---|---|---|
| BR | 102024006746 | 10/2025 |
| CN | 106104636 B | 1/2020 |

(Continued)

OTHER PUBLICATIONS

Kapoor, Akash, "Predicting Malfunctioning of ATM Machines in Real-Time with Oracle GoldenGate Stream Analytics", [Online]. Retrieved from the Internet: <https://blogs.oracle.com/dataintegration/post/predicting-malfunctioning-of-atm-machines-in-realtime-with-oracle-goldengate-stream-analytics>, (May 23, 2023), 9 pages.

(Continued)

*Primary Examiner* — Fekadeselassie Girma
(74) *Attorney, Agent, or Firm* — SCHWEGMAN LUNDBERG & WOESSNER, P.A.

(57) ABSTRACT

Systems and techniques are disclosed for automated self-diagnosis of surrounding lighting for Automated Teller Machines (ATMs). An example technique may include capturing light intensity data, with a sensor of the ATM, at a particular distance from the ATM, and comparing the light intensity data to a specified light intensity threshold of the ATM. The example technique may include determining, based on the comparison, that the light intensity data deviates from the specified light intensity threshold of the ATM, and in response to determining that the light intensity data deviates from the specified light intensity threshold of the ATM, generating an alert indicating the deviation.

18 Claims, 6 Drawing Sheets

(56) References Cited

U.S. PATENT DOCUMENTS

| | | | | |
|---|---|---|---|---|
| 11,120,121 | B1 | 9/2021 | Montenegro | |
| 11,514,364 | B2 | 11/2022 | Elisha et al. | |
| 11,688,251 | B1 | 6/2023 | Hamchuck et al. | |
| 12,087,138 | B2 * | 9/2024 | Sheth | G07F 19/209 |
| 12,125,352 | B2 * | 10/2024 | Misra | G07F 19/209 |
| 12,148,270 | B1 | 11/2024 | Peng et al. | |
| 12,148,271 | B1 * | 11/2024 | Singh | G06Q 20/1085 |
| 2004/0129772 | A1 | 7/2004 | Ramachandran et al. | |
| 2004/0204977 | A1 | 10/2004 | Obert | |
| 2006/0169764 | A1 | 8/2006 | Ross et al. | |
| 2009/0299800 | A1 | 12/2009 | Neilan | |
| 2011/0231705 | A1 | 9/2011 | Mcgraw, IV et al. | |
| 2018/0033292 | A1 | 2/2018 | Bhat | |
| 2018/0374318 | A1 * | 12/2018 | Sanjeevi | G07F 19/207 |
| 2019/0108734 | A1 | 4/2019 | Cook et al. | |
| 2020/0342741 | A1 * | 10/2020 | Benkreira | G07F 19/21 |
| 2020/0388116 | A1 | 12/2020 | Satanal et al. | |
| 2020/0410824 | A1 * | 12/2020 | Bhuvad | G06V 40/172 |
| 2021/0035101 | A1 * | 2/2021 | Pham | H04L 5/0058 |
| 2021/0081917 | A1 | 3/2021 | Blackford et al. | |
| 2021/0232966 | A1 | 7/2021 | Elisha et al. | |
| 2022/0237718 | A1 | 7/2022 | Konrardy et al. | |
| 2022/0321592 | A1 * | 10/2022 | Singh | G07F 19/207 |
| 2023/0012424 | A1 * | 1/2023 | Chauhan | H04L 12/1845 |
| 2023/0028010 | A1 * | 1/2023 | Pathak | G07F 19/2055 |
| 2023/0105353 | A1 * | 4/2023 | Smith | G07F 19/206<br>705/72 |
| 2024/0296453 | A1 * | 9/2024 | Singh | G06N 5/043 |
| 2024/0330879 | A1 * | 10/2024 | Ratcliffe, Jr. | G08B 21/18 |
| 2025/0054375 | A1 | 2/2025 | Chesley | |
| 2026/0050892 | A1 | 2/2026 | Digangi et al. | |
| 2026/0051228 | A1 * | 2/2026 | DiGangi | G07F 19/209 |

FOREIGN PATENT DOCUMENTS

| | | | | |
|---|---|---|---|---|
| CN | 112868032 A | | 5/2021 | |
| CN | 109477771 B | | 8/2021 | |
| CN | 115187261 A | * | 10/2022 | G06V 40/10 |

OTHER PUBLICATIONS

"U.S. Appl. No. 18/806,059, Non Final Office Action mailed Sep. 8, 2025", 21 pgs.

"U.S. Appl. No. 18/806,059, Response filed Nov. 14, 2025 to Non Final Office Action mailed Sep. 8, 2025", 12 pgs.

"U.S. Appl. No. 18/806,059, Final Office Action mailed Nov. 28, 2025", 24 pgs.

"U.S. Appl. No. 18/806,059, Response filed Jan. 20, 2026 to Final Office Action mailed Nov. 28, 2025", 12 pgs.

"U.S. Appl. No. 18/806,059, Advisory Action mailed Jan. 26, 2026", 3 pgs.

Hossain, Mohammad Naveed, "Utilizing the Internet of Things, Monitoring and Protecting System for Automated Teller Machines", Asian Journal For Convergence In Technology AJCT ISSN-2350-1146, 83, 2022, 5 pgs.

"U.S. Appl. No. 18/806,059, Non Final Office Action mailed Mar. 18, 2026", 26 pgs.

* cited by examiner

ATM SURROUNDING LIGHTING SELF-DIAGNOSIS

BACKGROUND

Adequate and consistent lighting is useful for the safe and secure operation of various cash handling hardware, including Automated Teller Machines (ATMs). Current methods for ensuring proper lighting rely on manual assessments, which can be time-consuming and inefficient. These methods often involve periodic site visits to measure lighting levels at specific locations around the equipment. This approach can lead to delays in identifying and addressing lighting deficiencies, potentially impacting both customer experience and security.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and techniques described herein may be used to overcome the limitations of traditional lighting monitoring techniques by capturing data at an ATM regarding surrounding lighting conditions. This self-assessment capability can help ensure compliance with regulatory requirements, improve operational efficiency, or enhance customer safety or security. In some examples, monitoring at an ATM may be done continuously. The ATM may monitor lighting levels at multiple distances around the ATM. A lighting level may be compared to a specified lighting level threshold to automatically identify any potential issues or generate an alert.

An example technique may include measuring a lighting level at a plurality of distances surrounding an ATM using a light sensor. The example technique may include capturing a baseline measurement comprising a measured lighting level and comparing the measured lighting level to a lighting level threshold for a specific distance from the ATM. In the example technique, in response to detecting that the measured lighting level deviates from the lighting level threshold for the specific distance, an alert may be generated.

Figure 1:
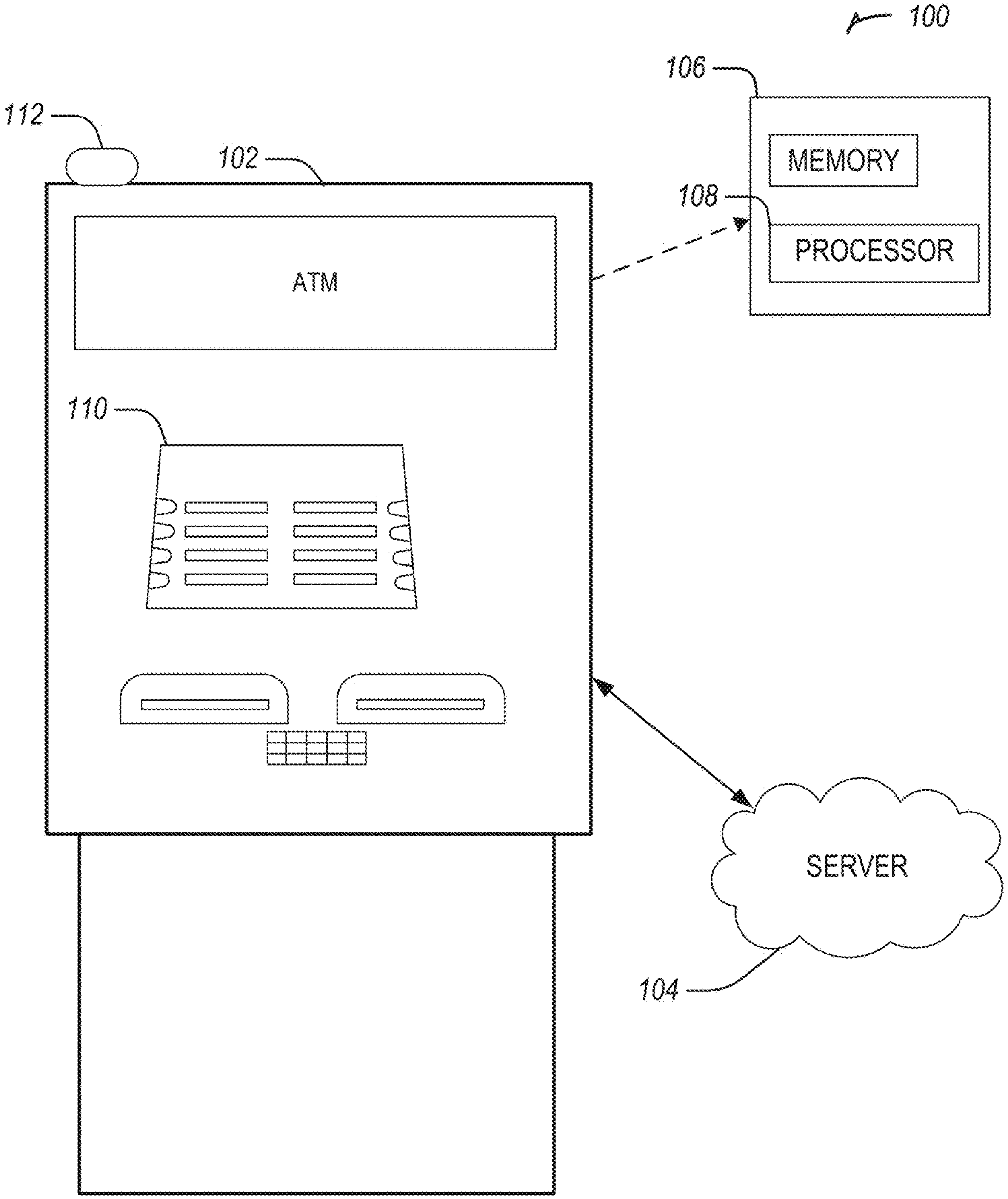
FIG. 1 illustrates a diagram showing components of a surrounding lighting self-diagnosis system in an ATM, according to various examples.

FIG. 1 illustrates a system 100 showing the main components of a surrounding lighting self-diagnosis system in an ATM. The system 100 includes an ATM 102 which further comprises a memory 106, a processor 108, a display 110, and a sensor 112. In some examples, the sensor 112 captures light intensity data at a specified interval and transmits this data to the processor 108. The processor 108 may compare the captured data to a predefined light intensity threshold. When the light intensity falls below the threshold, the processor 108 may generate an alert. This alert can be displayed on the user interface 120 of the ATM 102, transmitted to the server 104, be output audibly, or the like.

The ATM 102 may include a sensor 112 that is used to capture light intensity. The sensor 112 is shown in a particular location of the ATM 102, but may be located anywhere in, on, or near the ATM. The sensor 112 may include a camera, an infrared sensor, a multi-directional sensor, or the like. For example, the sensor 112 may be a camera that captures images of the area around the ATM 102, and the light intensity data may be extracted from the images using an image processing technique. The sensor 112 may be a light meter that measures the light intensity in lux or another unit. The sensor 112 may be an infrared sensor that measures the intensity of infrared light, which can be used to detect a heat source or other object that may be obstructing light around the ATM 102. In some examples, the sensor 112 includes a multi-directional sensor that captures light intensity data from multiple angles to allow for a more comprehensive assessment of the lighting conditions around the ATM 102.

The ATM 102 may include various hardware or software components, such as those necessary or useful for a financial transaction. In some examples, the ATM 102 may be a freestanding unit. In other examples, the ATM 102 may be integrated into a wall or other structure.

The memory 106 stores data and instructions for the ATM 102, which may include control instructions for operation of the ATM 102. The data may include data related to a lighting monitoring system. The memory 106 may store historical lighting data, which may be used to establish baseline lighting conditions or detect deviations over time. In some examples, the historical light intensity data can be used by the processor 108 to identify a trend or a pattern in the lighting level around the ATM 102. In other examples, the processor 108 may use the historical data to train a machine learning model to improve the accuracy of the lighting diagnosis system.

The processor 108 executes the instructions stored in the memory 106. In some examples, the processor 108 may control operation of the ATM 102, including processing transactions, communicating with the server 104, or analyzing data from the sensor 112. The processor 108 may compare captured light intensity data to a specified threshold to generate an alert when the data traverses the specified threshold. The processor 108 may be used to adjust the sensitivity of the sensor 112, control the timing of the light intensity measurements, or activate another component of the ATM 102, such as in response to a change in lighting conditions. In other examples, the processor 108 may be used to execute a machine learning model to improve the accuracy and efficiency of the lighting diagnosis system.

The display 110 and user interface 120 may include buttons, a touchscreen, another input/output device, or the like. The display 110 may be used to show information to the user, such as an account balance, a transaction history, a prompt for input, etc. The user interface 112 may be used to allow the user to interact with the ATM 102, such as by entering a PIN, selecting a transaction type, or viewing account information. In some examples, the display 110 may be used to display an alert or a notification related to the lighting conditions around the ATM 102. For example, when the light intensity falls below a specified threshold, the display 110 may show a warning message to the user or a notification to the ATM operator. The user interface 112 may allow the user to adjust a lighting setting of the ATM 102, such as a brightness of a user interface, activation of a light, a direction of a light, a duration of light illumination, a color of a light, or the like.

The ATM 102 is communicatively connected to a server 104. The communication between the ATM 102 and the server 104 may occur over a network connection, either wired or wireless. In some examples, the server 104 may receive an alert from the ATM 102, store historical lighting data, or provide remote access to the a setting or a functionality of the ATM 102. In some examples, the server 104 may be used to update the ATM 102 (e.g., software, firmware, sending data for storage, etc.), generate a report, or the like.

The sensor 112 may be used to capture light intensity data around the ATM 102. The captured light intensity data may be used to assess lighting conditions or detect a deviation from a specified threshold. The sensor 112 may include any type of light sensor, such as a photodiode, a phototransistor, or a camera. The sensor 112 may be used to capture light intensity data at different locations around the ATM 102. The light intensity data can be used to determine whether the lighting level around the ATM 102 meets a specified light intensity threshold, which can be set according to a regulatory requirement.

In some examples, the sensor 112 may be a camera. The camera can capture images of the area surrounding the ATM 102. These images can be analyzed to assess the lighting conditions.

In other examples, the sensor 112 may be an infrared sensor. The infrared sensor can detect infrared light. This light is invisible to the human eye but can be used to measure the intensity of light sources.

In other examples, the sensor 112 may be a multi-directional sensor. The multi-directional sensor can capture light intensity data. The multi-directional sensor collects this data from multiple directions, providing a more comprehensive assessment of the lighting conditions.

In some examples, when the light intensity data falls below the threshold, the ATM 102 can generate an alert indicating that the lighting level is too low. An alert indicating the lighting level has fallen below a specified light intensity threshold can be displayed on the user interface 112 of the ATM 102. In other examples, the alert may be sent to a remote monitoring system, displayed on the user interface 112, or both.

Figure 2:
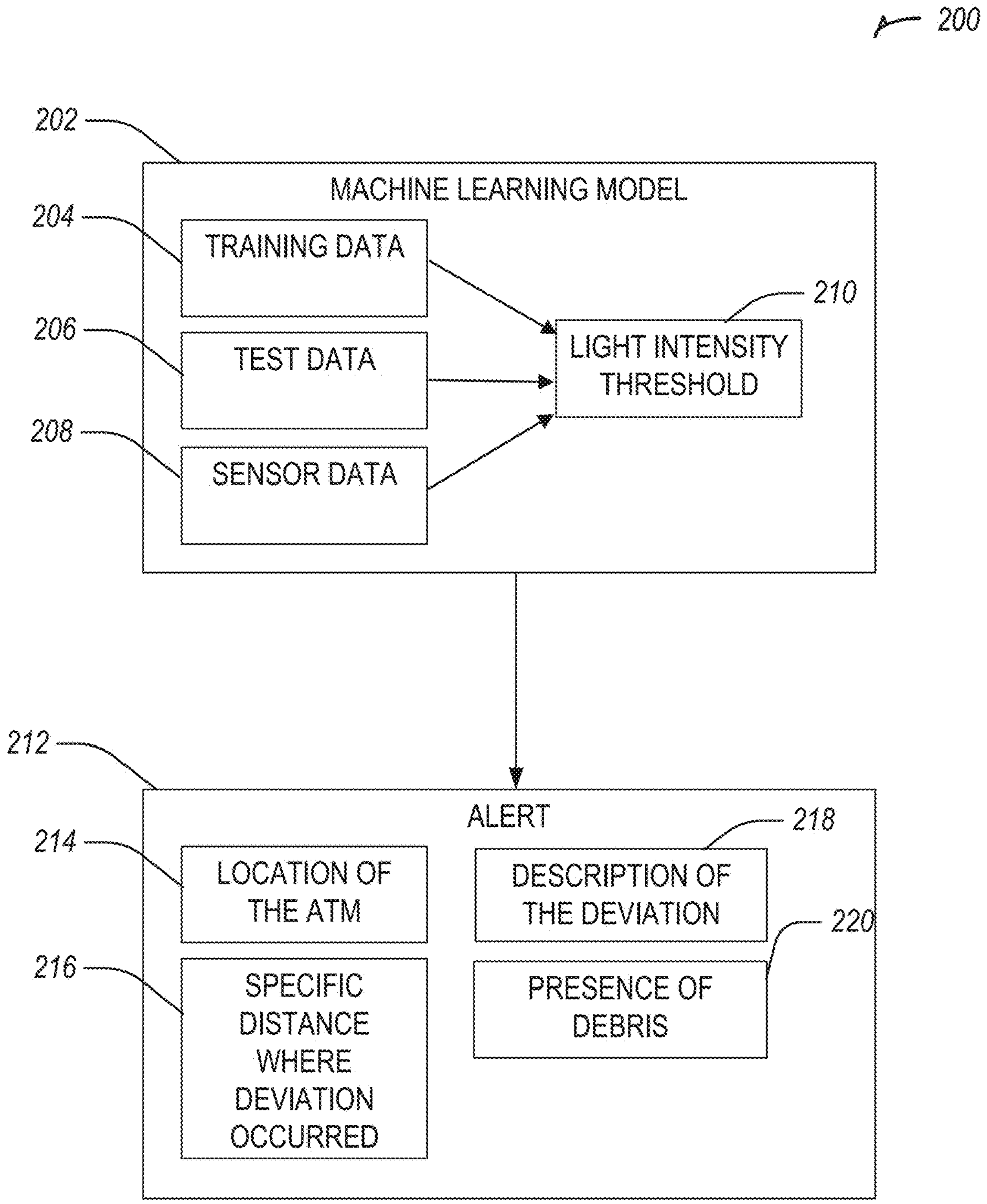
FIG. 2 illustrates a block diagram for measuring a lighting level surrounding an ATM, according to various examples.

FIG. 2 illustrates a block diagram for measuring the lighting levels surrounding an ATM. The block diagram 200 illustrates a machine learning (ML) model 202 and an alert block 212.

The machine learning model 202 may be a model trained to analyze light intensity sensor data 218 or assess lighting levels at a distance proximate to an ATM. The light intensity data captured by a sensor, such as measurements from photodiodes, photoresistors, or lux meters can be used to train the machine learning model 202. In some examples, the machine learning model 202 may use supervised learning, unsupervised learning, or reinforcement learning techniques to learn patterns and relationships in the data. The model 202 may be trained to recognize a specific type of lighting issue, such as a non-functional light, a dirty sensor, an obstruction between a light source and the ATM, or the like.

The training data 204 or test data 206 may be used to develop or refine the machine learning model 202 to accurately predict lighting conditions. The training data 204 may include a large dataset of light intensity measurements taken under various conditions, along with corresponding labels indicating whether the lighting levels were adequate (e.g., a lighting level, a yes or no, etc.). The test data 206 may include a separate dataset used to evaluate the performance of the machine learning model 202 after training.

A light intensity threshold 210 may include a specified value or range of values that define an acceptable lighting level around the ATM. In some examples, this threshold may be based on one or more factors, such as a safety regulation, an industry standard, a specific requirement of the ATM location, or the like. The machine learning model 202 may use the light intensity threshold 210 to determine whether the captured light intensity data indicates a potential lighting issue.

The machine learning model 202 may be used to monitor the light intensity data in real-time and determine whether the lighting levels around the ATM meet the specified light intensity threshold 210. When the light intensity data deviates from the light intensity threshold 210, the machine learning model 202 can generate an alert at alert block 212. The alert block 212 can include information about the location of the ATM at block 214, the specific distance where the deviation occurred at block 216, a description of the deviation at block 218, or the presence of debris at block 220.

The location of the ATM at block 214 may include information to identify the specific ATM experiencing the lighting issue. The specific distance where the deviation occurred at block 216 may include information to identify the location around the ATM where the lighting problem exists or occurred. The description of the deviation at block 218 may provide details about the nature of the lighting problem, such as whether the light intensity is too low, too high, or fluctuating erratically. The presence of debris at block 220 may indicate the presence of debris obstructing the light sensor or the light source itself, such as dirt, dust, or cobwebs.

The alert 212 can be used to notify a technician or other personnel of the lighting issue. The technician can take steps to resolve the issue, such as replacing a non-functioning light or cleaning the sensor. The machine learning model 202 can monitor the lighting levels around the ATM to proactively identify or resolve a lighting issue before the lighting issue causes a problem for a customer or security of the ATM. In some examples, the machine learning model 202 may be used to optimize the lighting levels around the ATM by analyzing historical data and outputting an indication to adjust a brightness of a light or user interface, for example based on a time of day, weather conditions, or other factors. The machine learning model 202 may predict a potential lighting issue before occurrence. In other examples, the machine learning model 202 may be used to identify a pattern in lighting data that may indicate a problem with the ATM.

Figure 3:
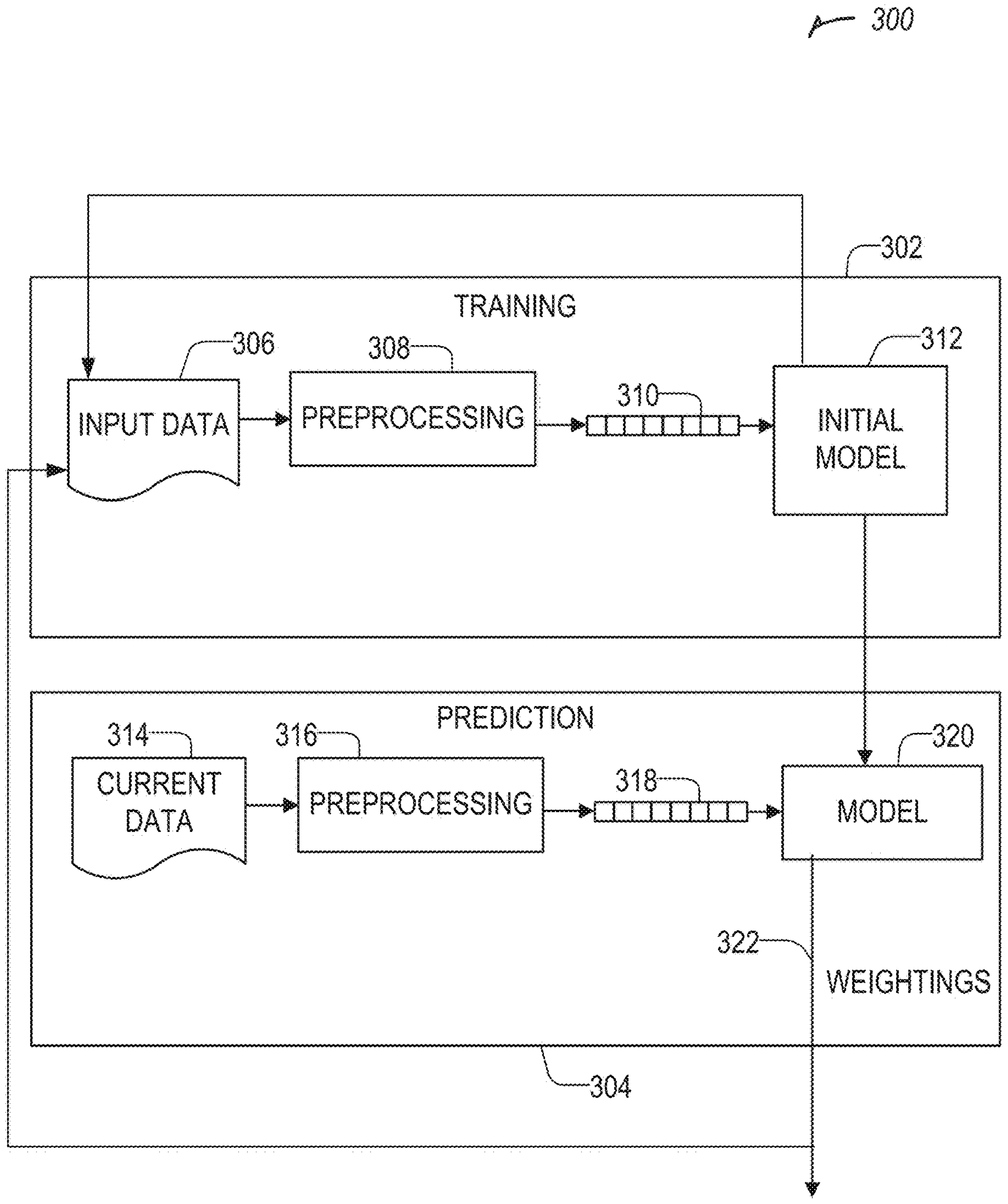
FIG. 3 illustrates machine learning engine for training and execution related to performing a surrounding lighting assessment, according to various examples.

FIG. 3 illustrates a machine learning engine for training and execution related to performing a surrounding lighting assessment, according to various examples. The machine learning engine may be deployed to execute at an ATM or a computer. A machine learning system 300 may calculate one or more weightings for criteria based upon one or more machine learning algorithms. FIG. 3 shows an example machine learning system 300 according to some examples of the present disclosure.

The machine learning system 300 includes a training phase 302 and a prediction phase 304. In the training phase 302, input data 306, which may include historical or simulated data representing various ATM conditions, may undergo preprocessing at block 308. Preprocessing may include cleaning the data, removing outliers, or transforming the data into a suitable format for for training the machine learning system 300. In an example, the preprocessed data may be used to determine one or more features 310. The one or more features 310 may be used to generate an initial model 312, which may be updated iteratively or with future labeled or unlabeled data (e.g., during reinforcement learning or other further learning). Updating the initial model 312 may include improving performance of the initial model 312 or the training phase 302. An improved model may be redeployed for use, for example at a local device (e.g., an ATM).

The input data 306 may include historical lighting data, environmental data, time of day data, geographic location data, ATM-specific information, or the like. In some examples, the input data 306 may include time-stamped records of light intensity measurements taken at different distances from the ATM over extended periods to facilitate the model learning the typical lighting patterns and variations through the day, night, or different seasons. In some examples, the input data 306 may include weather conditions such as cloud cover, rain, or snow to account for variations in surrounding lighting conditions. The input data 306 may be time-stamped to allow the model to differentiate between normal variations and abnormal deviations due to malfunctioning lights, obstructions, or other issues.

The input data 306 may include a latitude, longitude, or time zone of the ATM to account for differences in daylight hours or sunlight angles at different locations. In an example, the input data 306 may include information about the type of lighting used (e.g., LED, fluorescent), the number and placement of the light fixtures, or the age of the lighting system to improve the accuracy and predictions or reduce false alarms caused by variations in lighting equipment. The input data 306 may be collected by the one or more light intensity sensors of an ATM, such as at predetermined intervals, or may be adjusted dynamically based on the time of day, weather conditions, or other factors that may affect the lighting levels around the ATM.

In the prediction phase 304, current data 314 (e.g., current lighting data) may be input to preprocessing component 316 for preprocessing. In some examples, preprocessing component 308 and preprocessing component 316 are the same. The prediction phase 304 produces feature vector 318 from the preprocessed current data, which is input into the model 320 to generate one or more criteria weightings 322. The criteria weightings 322 may be used to output a prediction, as discussed further below.

In some examples, an output of the machine learning system 300 (e.g., the model 320) may include a binary output (e.g., "normal" or "abnormal"), a probability estimate of a current lighting level, a current or predicted visibility around the ATM, or the like. The model 320 may be improved by retraining the model 320 with new data or adjusting the weightings 322 as needed, allowing the model 320 to be adapted to changing conditions or improved in accuracy over time.

During training, the model may learn to associate certain patterns of light intensity with specific lighting conditions (e.g., normal operation, insufficient lighting, or excessive lighting). When new light intensity data is collected in the prediction phase 304, the model 320 may analyze the new data and determine whether the current lighting level patterns match those associated with specific lighting conditions. In an example, in response to determining that the current light intensity patterns match those associated with an abnormal lighting condition, the model 320 may output a prediction indicating that the lighting level around the ATM is outside of an acceptable range.

In some examples, once the model makes a prediction, the output may be compared against a specified light intensity threshold to determine whether the lighting levels around the ATM are within acceptable parameters. If the prediction exceeds the specified light intensity threshold, the system may generate an alert.

The training engine 302 may operate in an offline manner to train the model 320 (e.g., on a server). The prediction engine 304 may be designed to operate in an online manner (e.g., in real-time, at a mobile device, or on a computer). In some examples, the model 320 may be periodically updated via additional training (e.g., via updated input data 306 or based on labeled or unlabeled data output in the weightings 322) or based on identified future data, such as by using reinforcement learning to personalize a general model (e.g., the initial model 312) to a particular user or ATM.

Labels for the input data 306 may include various a category or an attribute associated with light intensity data. For example, a label may specify whether the light intensity is within acceptable levels, too high, or too low. The model 320 may be trained with historical light intensity data, including timestamps, location information, or weather conditions. The model 320 may identify or label recurring patterns associated with specific ATM locations or times of day.

The initial model 312 may be updated using further input data 306 until a satisfactory model 320 is generated. The model 320 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 302 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 302. In an example embodiment, a regression model is used and the model 320 is a vector of coefficients corresponding to a learned importance for each of the features in the vector of features 310, 318. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 320 may output a prediction of the lighting condition around the ATM, for example classifying the lighting condition as adequate, insufficient, or excessive based on one or more thresholds. The output may be a probability score indicating the likelihood of a lighting issue. In other examples, the model 320 may output information such as the location or distance where a lighting deviation is detected, or the type of deviation observed (e.g., low light intensity, flickering, or glare). This information may be outputted on a user interface (e.g., of the ATM or a technician mobile device) or transmitted to a remote server for further analysis or action.

In some examples, the model 320 may generate a detailed report summarizing the lighting conditions, highlighting any deviations, or suggesting a corrective measure, such as adjusting the brightness of a light or cleaning a sensor. The model 320 may identify a pattern or a trend in the lighting data, such as a recurring issue at a specific time of day or under certain weather conditions.

Figure 4:
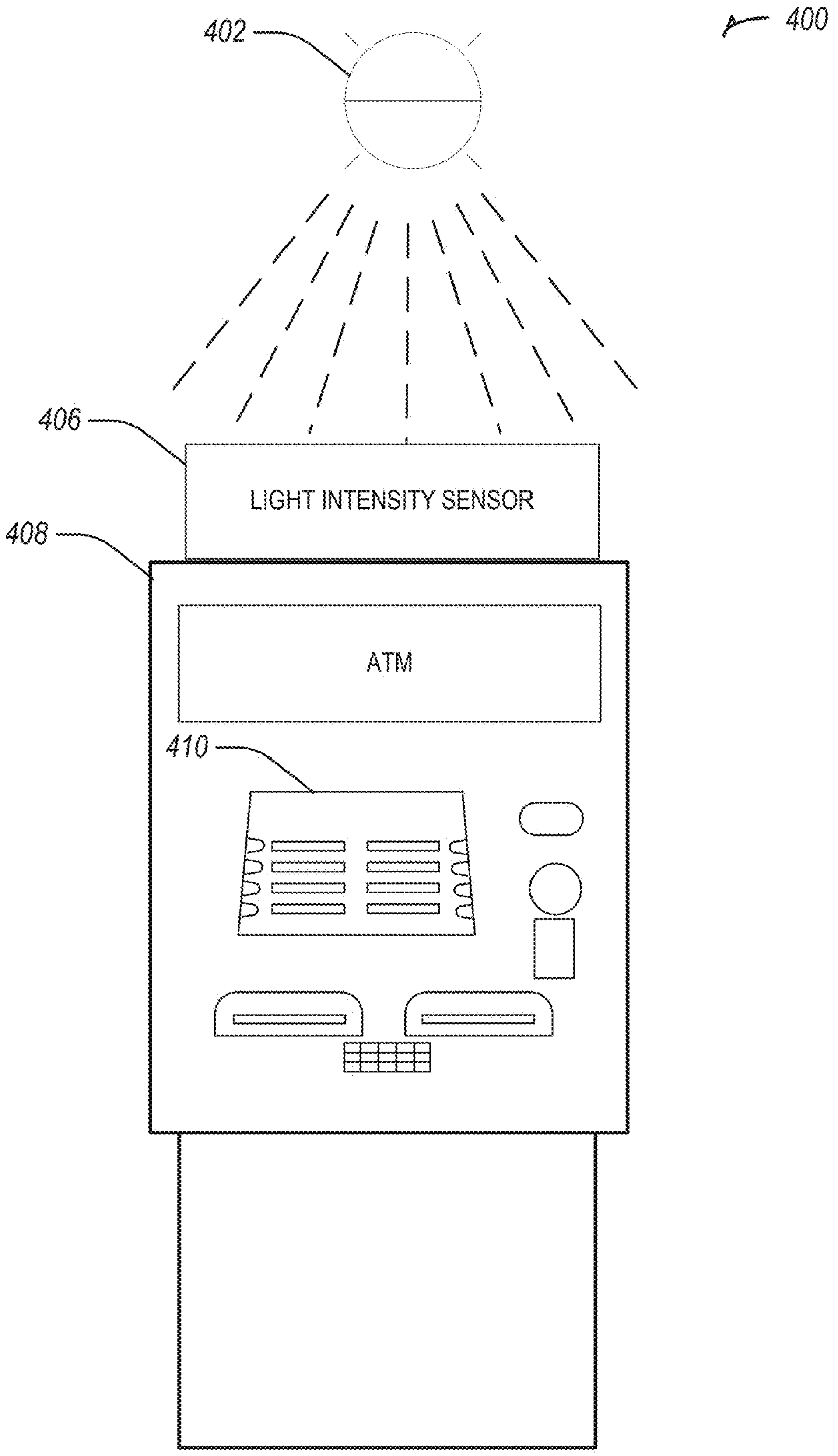
FIG. 4 illustrates an ATM including a sensor to capture light intensity data at proximate to the ATM, according to various examples.

FIG. 4 illustrates an ATM 408 including a sensor 406 to capture light intensity data at a proximate distance to the ATM 408, according to various examples. In an example, the light source 402, which can be any type of light source, such as a fluorescent light, an LED light, a halogen light, the sun, or the like, is positioned proximate or remote from the ATM 408. The light source 402 may be positioned above, adjacent to, behind, or around the ATM 408, for example, or be integrated with the ATM. The light source 402 may be internal to the ATM 408 or external to the ATM 408.

In some examples, the sensor 406 is controlled by the ATM 408 to capture light intensity data from the light source 402. The sensor 406 can be any type of light sensor, such as a photodiode, a phototransistor, a camera, or the like. The sensor 406 can be an infrared sensor or a multi-directional sensor that captures light intensity data from multiple angles. The light intensity data captured by the sensor 406 can be used to determine whether the lighting level around the ATM 408 meets a specified light intensity threshold. The specified light intensity threshold may be a predetermined value that is stored in memory or retrieved from a database. The threshold may be based on regulatory requirements, industry standards, or the specific needs of the ATM location.

When the light intensity data falls below the threshold, the ATM 408 can generate an alert indicating that the lighting level is too low. The alert can be displayed on the user interface 410 of the ATM 408, sent to a remote monitoring system, or the like. The alert may trigger an alarm or other security measure, such as temporarily disabling the ATM 408 until the lighting issue is resolved. In some examples, the alert may include a classification of the lighting issue, such as insufficient lighting, excessive lighting, or obstructed lighting. The classification may be based on a specific pattern or characteristic of the light intensity data, such as the magnitude of a deviation from the threshold, a duration of a deviation, presence of shadows, or similar anomalies in the data.

In some examples, the light source 402 may become obstructed by a tree branch, new construction, or an object, such as to cause the light intensity data to fall below the threshold. In another example, the light sensor 402 may malfunction or burn out, resulting in a decrease in light intensity. The sensor 410 can detect the deviation from a specified light intensity threshold or trigger an alert.

The sensor 410 may capture light intensity data at intervals depending on the specific implementation or requirements. In some examples, the sensor may capture data periodically (e.g., every second, every minute, etc.). The frequency of data capture may depend on various factors, such as a specific requirement of the ATM or location of the ATM, sensitivity of the sensor, desired level of accuracy, etc. The frequency of data capture may be adjusted dynamically based on time of day, weather conditions, or other factors that may affect the lighting levels around the ATM 408.

To establish a baseline light intensity measurement, the sensor 410 can capture light intensity data over a period of time under normal operating conditions. This baseline measurement can then be used as a reference point for comparison with subsequent light intensity data. Significant deviations from the baseline measurement that may indicate a lighting issue can then generate an alert.

The light intensity threshold can be selected based on various factors, such as regulatory requirements, industry standards, or the specific needs of the ATM location. For example, some regulations may require a minimum lighting level around the ATM 408 for security purposes. The threshold maybe adjusted based on the time of day or other factors that may affect the visibility around the ATM 408.

The captured light intensity data may be stored in the ATM's memory or transmitted to a remote server for further analysis. The data may be used to generate reports on the lighting levels around the ATM, identify trends over time, or compare the lighting levels of different ATMs. The data may be used to train machine learning models to improve the accuracy or efficiency of the light monitoring system.

Figure 5:
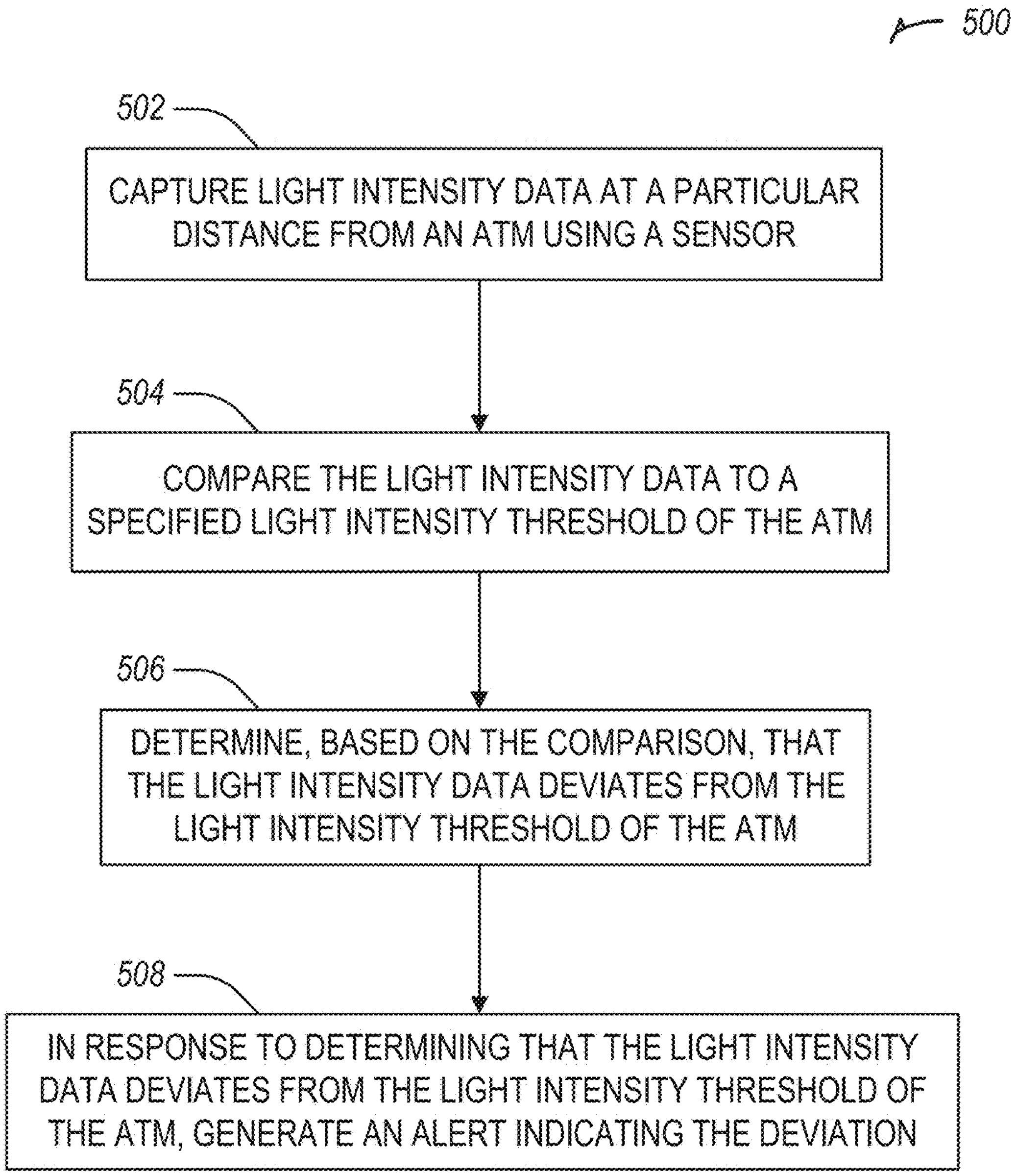
FIG. 5 illustrates a flowchart showing a technique for measuring light around an ATM, according to various examples.

FIG. 5 illustrates a flowchart showing a technique 500 for measuring the surrounding light around an ATM or performing a comparison against a predetermined lighting level. In one example, the technique 500 may be implemented by a processor of the ATM. In another example, the technique may be implemented by another processing system, such as a server.

The technique 500 includes an operation 502 for capturing light intensity data at a particular distance from an ATM using a sensor. In some examples, the sensor may be a camera that captures images of the area around the ATM, or light intensity data may be extracted from the images. The camera may be a standard RGB camera, an infrared camera, or a combination of both. In another example, the sensor may be a light meter that directly measures the light intensity. The light meter may be a handheld device or a sensor that is integrated into the ATM.

The technique 500 includes an operation 504 for comparing the light intensity data to a specified light intensity threshold of the ATM. In some examples, the light intensity threshold may be a specified value that is stored in memory or retrieved from a database. The threshold may be based on regulatory requirements, industry standards, or the specific needs of the ATM location. The comparison may be performed using a variety of methods, such as calculating the difference between the light intensity data and the threshold, or determining whether the light intensity data falls within a specified range around the threshold. The comparison may take into account other factors, such as the time of day, the weather conditions, or the type of lighting used around the ATM.

The technique 500 includes an operation 506 for determining, based on the comparison, that the light intensity data deviates from the light intensity threshold of the ATM. In some examples, the deviation may be determined if the light intensity data is outside of the specified range or if the difference between the light intensity data and the threshold exceeds a certain value. The deviation may be determined based on an analysis of the light intensity data, such as a comparison to historical data or a trend analysis.

The technique 500 includes an operation 508 for, in response to determining that the light intensity data deviates from the light intensity threshold of the ATM, generating an alert indicating the deviation. In some examples, the alert may be a visual or audible signal, a message displayed on a screen, or a notification sent to to a remote system. The alert may include information about the location of the ATM, the specific distance where to deviation occurred, or the magnitude of the deviation. The alert may be sent to a technician or other personnel responsible for maintaining the ATM, or it may be logged for later analysis. In some examples, the alert may trigger an automatic response, such as adjusting the lighting levels around the ATM.

Figure 6:
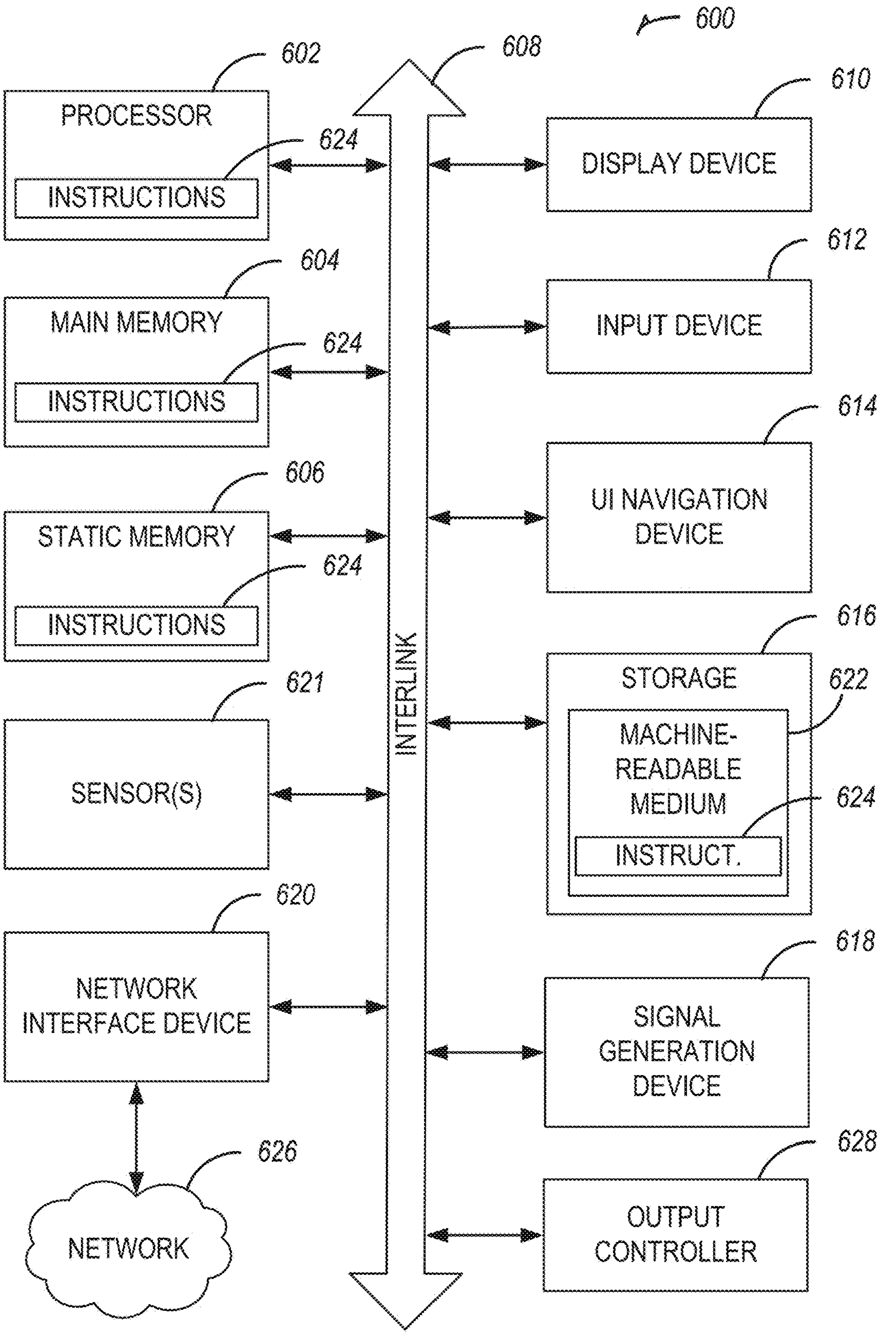
FIG. 6 illustrates generally an example of a block diagram of a machine upon which any one or more of the techniques discussed herein may perform, according to various examples.

FIG. 6 illustrates generally an example of a block diagram of a machine upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

The following, non-limiting examples, detail certain aspects of the present subject matter to solve the challenges and provide the benefits discussed herein, among others.

Example 1 is a method for sensing an illumination level proximate an Automated Teller Machine (ATM), the method comprising: capturing light intensity data, with a sensor of the ATM, at a particular distance from the ATM; comparing the light intensity data to a specified light intensity threshold of the ATM; determining, based on the comparison, that the light intensity data deviates from the specified light intensity threshold of the ATM; and in response to determining that the light intensity data deviates from the specified light intensity threshold of the ATM, generating an alert indicating the deviation.

In Example 2, the subject matter of Example 1 includes, in response to capturing the light intensity data, establishing a baseline light intensity measurement at the particular distance from the ATM and using the baseline light intensity measurement to revise the specified light intensity threshold.

In Example 3, the subject matter of Examples 1-2 includes, detecting, using the sensor, a presence of debris within a predetermined radius of the ATM.

In Example 4, the subject matter of Examples 1-3 includes, wherein the sensor includes a camera, the camera including a lens configured to image the specified distance away from the ATM onto a plane of the sensor, and wherein the lens has an angular field of view that extends away from the ATM.

In Example 5, the subject matter of Examples 1-4 includes, wherein the specified light intensity threshold is based on an applicable regulatory requirement.

In Example 6, the subject matter of Examples 1-5 includes, wherein the alert includes at least one of a location of the ATM, a specific distance where the deviation occurred, or a description of the deviation.

In Example 7, the subject matter of Examples 1-6 includes, wherein the sensor is a multi-directional sensor configured to capture the light intensity data from an angle around the ATM.

In Example 8, the subject matter of Examples 1-7 includes, capturing data including a plurality of light intensity measurements over a specified time interval, each light intensity measurement including a light intensity at the particular distance away from the ATM at a respective time in the specified time interval; establishing a baseline light intensity value from the plurality of light intensity measurements; comparing the baseline light intensity value to the specified light intensity threshold; determining, from the comparison of the baseline light intensity value to the specified light intensity threshold, that the baseline light intensity value deviates from the specified light intensity threshold; and in response to determining the baseline light intensity value is less than the specified light intensity threshold, generating an alert indicating that the light source is faulty.

Example 9 is a system comprising: processing circuitry; and memory, including instructions, which when executed by the processing circuitry, causes the processing circuitry to: capture light intensity data at a first specified distance and a second specified distance from an Automated Teller Machine (ATM) using a sensor; determine, for the first specified distance, whether the light intensity data at the first specified distance deviates from a first specified light intensity threshold; determine, for the second specified distance, whether the light intensity data at the second specified distance deviates from a second specified light intensity threshold; and in response to determining that the light intensity data deviates from the first specified light intensity threshold or second specified light intensity threshold, generate an alert indicating a distance at which the deviation occurred.

In Example 10, the subject matter of Example 9 includes, wherein the processor is further configured to, in response to capturing the light intensity data at the first specified distance, establish a first baseline light intensity data measurement and monitoring, over a specified period of time, the light intensity data at the first specified distance.

In Example 11, the subject matter of Examples 9-10 includes, wherein the processor is further configured to, in response to capturing the light intensity data at the second specified distance, establish a second baseline light intensity data measurement and monitoring, over a specified period of time, the light intensity data at the second specified distance.

In Example 12, the subject matter of Examples 9-11 includes, wherein the first specified distance is proximate to the ATM.

In Example 13, the subject matter of Examples 9-12 includes, wherein the memory further stores historical light intensity data for the ATM, and the processing circuitry is further configured to use the historical light intensity data to determine that the light intensity data deviates from the first specified light intensity threshold or second specified light intensity threshold.

Example 14 is at least one non-transitory machine-readable medium including instructions, which when executed by processing circuitry, cause the processing circuitry to perform operations to: capture light intensity data proximate to an Automated Teller Machine (ATM) using a sensor; compare the light intensity data to a specified light intensity threshold of the ATM; determine, based on the comparison, that the light intensity data deviates from the specified light intensity threshold of the ATM; and in response to determining that the light intensity data deviates from the specified light intensity threshold for the ATM, generate an alert indicating the deviation.

In Example 15, the subject matter of Example 14 includes, wherein the instructions further cause the processing circuitry to perform operations to continuously monitor the light intensity data at a specified distance using the sensor.

In Example 16, the subject matter of Examples 11-15 includes, wherein the instructions further cause the processing circuitry to perform operations to capture a baseline measurement of light intensity data and compare subsequent measurements to the baseline measurement to identify a potential lighting level issue before it impacts ATM operation or security.

In Example 17, the subject matter of Examples 11-16 includes, wherein the instructions further cause the processing circuitry to perform operations to: generate a visual representation of a lighting level around the ATM; and output the visual representation for display on a user interface accessible to a technician.

In Example 18, the subject matter of Examples 11-17 includes, wherein the instructions are further adapted to be executed in coordination with a security system associated with the ATM, such that the alert causes the security system to trigger an additional security measure.

In Example 19, the subject matter of Examples 11-18 includes, wherein the capture of the light intensity data is performed at a specified time interval, and wherein the light intensity data from each time interval is stored for comparison to subsequent light intensity data and the specified light intensity threshold.

In Example 20, the subject matter of Examples 11-19 includes, wherein the instructions further cause the processing circuitry to perform an operation to analyze historical light intensity data for the ATM to identify a potential issue, and wherein generating the alert is based at least in part on identifying the potential issue.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for sensing an illumination level proximate an Automated Teller Machine (ATM), the method comprising:

capturing light intensity data, with a sensor of the ATM, at a particular distance from the ATM;

analyzing historical light intensity data for the ATM including comparing the light intensity data to a specified light intensity threshold of the ATM;

determining, based on the analyzing including the comparison, that the light intensity data deviates from the specified light intensity threshold of the ATM; and in response to determining that the light intensity data deviates from the specified light intensity threshold of the ATM, generating an alert indicating the deviation based at least in part on the historical light intensity data.

2. The method of claim 1, further comprising, in response to capturing the light intensity data, establishing a baseline light intensity measurement at the particular distance from the ATM and using the baseline light intensity measurement to revise the specified light intensity threshold.

3. The method of claim 1, further comprising detecting, using the sensor, a presence of debris within a predetermined radius of the ATM.

4. The method of claim 1, wherein the sensor includes a camera, the camera including a lens configured to image the specified distance away from the ATM onto a plane of the sensor, and wherein the lens has an angular field of view that extends away from the ATM.

5. The method of claim 1, wherein the specified light intensity threshold is based on an applicable regulatory requirement.

6. The method of claim 1, wherein the alert includes at least one of a location of the ATM, a specific distance where the deviation occurred, or a description of the deviation.

7. The method of claim 1, wherein the sensor is a multi-directional sensor configured to capture the light intensity data from an angle around the ATM.

8. The method of claim 1, further comprising:

capturing data including a plurality of light intensity measurements over a specified time interval, each light intensity measurement including a light intensity at the particular distance away from the ATM at a respective time in the specified time interval;

establishing a baseline light intensity value from the plurality of light intensity measurements;

comparing the baseline light intensity value to the specified light intensity threshold;

determining, from the comparison of the baseline light intensity value to the specified light intensity threshold, that the baseline light intensity value deviates from the specified light intensity threshold; and in response to determining the baseline light intensity value is less than the specified light intensity threshold, generating an alert indicating that the light source is faulty.

9. A system comprising:

processing circuitry; and memory, including instructions, which when executed by the processing circuitry, causes the processing circuitry to:

capture light intensity data at a first specified distance and a second specified distance from an Automated Teller Machine (ATM) using a sensor;

determine, for the first specified distance, whether the light intensity data at the first specified distance deviates from a first specified light intensity threshold;

determine, for the second specified distance, whether the light intensity data at the second specified distance deviates from a second specified light intensity threshold;

in response to determining that the light intensity data deviates from the first specified light intensity threshold or second specified light intensity threshold, generate an alert indicating a distance at which the deviation occurred, wherein the memory further stores historical light intensity data for the ATM; and use the historical light intensity data to determine that the light intensity data deviates from the first specified light intensity threshold or second specified light intensity threshold.

10. The system of claim 9, wherein the processing circuitry is further configured to, in response to capturing the light intensity data at the first specified distance, establish a first baseline light intensity data measurement and monitoring, over a specified period of time, the light intensity data at the first specified distance.

11. The system of claim 9, wherein the processing circuitry is further configured to, in response to capturing the light intensity data at the second specified distance, establish a second baseline light intensity data measurement and monitoring, over a specified period of time, the light intensity data at the second specified distance.

12. The system of claim 9, wherein the first specified distance is proximate to the ATM.

13. At least one non-transitory machine-readable medium including instructions, which when executed by processing circuitry, cause the processing circuitry to perform operations to:

capture light intensity data proximate to an Automated Teller Machine (ATM) using a sensor;

compare the light intensity data to a specified light intensity threshold of the ATM;

determine, based on the comparison, that the light intensity data deviates from the specified light intensity threshold of the ATM;

analyze historical light intensity data for the ATM to identify a potential issue; and in response to determining that the light intensity data deviates from the specified light intensity threshold for the ATM, generate an alert indicating the deviation based at least in part on identifying the potential issue.

14. The at least one non-transitory machine-readable medium of claim 13, wherein the instructions further cause the processing circuitry to perform operations to continuously monitor the light intensity data at a specified distance using the sensor.

15. The at least one non-transitory machine-readable medium of claim 13, wherein the instructions further cause the processing circuitry to perform operations to capture a baseline measurement of light intensity data and compare subsequent measurements to the baseline measurement to identify a potential lighting level issue before it impacts ATM operation or security.

16. The at least one non-transitory machine-readable medium of claim 13, wherein the instructions further cause the processing circuitry to perform operations to:

generate a visual representation of a lighting level around the ATM; and output the visual representation for display on a user interface accessible to a technician.

17. The at least one non-transitory machine-readable medium of claim 13, wherein the instructions are further adapted to be executed in coordination with a security system associated with the ATM, such that the alert causes the security system to trigger an additional security measure.

18. The at least one non-transitory machine-readable medium of claim 13, wherein the capture of the light intensity data is performed at a specified time interval, and wherein the light intensity data from each time interval is stored for comparison to subsequent light intensity data and the specified light intensity threshold.

* * * * *